United States Patent
Takara (10) Patent No.: US 9,074,509 B2
(45) Date of Patent: Jul. 7, 2015

(54) CONTROL APPARATUS FOR VEHICLE (75) Inventor: Atsushi Takara, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 299 days.

(21) Appl. No.: 13/574,885

(22) PCT Filed: Apr. 26, 2011

(86) PCT No.: PCT/IB2011/000887
§ 371 (c)(1),
(2), (4) Date: Jul. 24, 2012

(87) PCT Pub. No.: WO2011/135428
PCT Pub. Date: Nov. 3, 2011

(65) Prior Publication Data
US 2013/0035845 A1  Feb. 7, 2013

(30) Foreign Application Priority Data

Apr. 27, 2010  (JP) ................. 2010-101964

(51) Int. Cl.
*G06F 19/00* (2011.01)
*F01N 3/20* (2006.01)
(Continued)

(52) U.S. Cl.
CPC .............. *F01N 3/2013* (2013.01); *B60K 6/445* (2013.01); *B60W 10/06* (2013.01); *B60W 10/08* (2013.01);
(Continued)

(58) Field of Classification Search
CPC ....... F01N 3/20; F01N 3/2006; F01N 3/2013; F01N 9/00; F01N 13/009; F02D 41/062–41/068; B60W 2530/12; B60W 10/06

USPC ......... 60/284, 286, 300, 320, 303; 123/179.3, 123/179.16, 179.17, 685; 701/113; 180/65.21–65.29; 903/902–960

See application file for complete search history.

(56) References Cited

U.S. PATENT DOCUMENTS 5,785,137 A * 7/1998 Reuyl ..................... 180/65.245
5,966,931 A * 10/1999 Yoshizaki et al. ............. 60/284
(Continued)

FOREIGN PATENT DOCUMENTS

JP  2008-239078 A  10/2008
JP  2008-261295 A  10/2008
(Continued)

OTHER PUBLICATIONS

International Search Report and Written Opinion for corresponding International Patent Application No. PCT/IB2011/000887 mailed Aug. 29, 2011.

(Continued)

*Primary Examiner* — Lindsay Low
*Assistant Examiner* — Robert Werner
(74) *Attorney, Agent, or Firm* — Sughrue Mion, PLLC (57) ABSTRACT

In a vehicle that includes an electrically heatable first catalyst EHC (140) in an exhaust passageway of an engine and a second catalyst UFC (145) disposed downstream of the EHC, an ECU (150) predicts that the load following starting of the engine will be higher than the load that corresponds to the exhaust gas purification capability of the EHC, and starts an engine motoring control of forcing the engine to turn via an electric motor (S32), if, during a pre-heating control of electrically controlling the EHC prior to starting of the engine, the demanded drive force F is greater than a predetermined value F1 and the amount of increase $\Delta F$ of the demanded drive force F per unit time is greater than a predetermined amount $\Delta F1$.

9 Claims, 7 Drawing Sheets

(51) Int. Cl.
  *B60K 6/445*   (2007.10)
  *B60W 10/06*   (2006.01)
  *B60W 10/08*   (2006.01)
  *B60W 20/00*   (2006.01)
  *B60W 30/192*  (2012.01)
  *F01N 13/00*   (2010.01)
  *B60W 50/00*   (2006.01)
  *F01N 9/00*    (2006.01)

(52) U.S. Cl.
  CPC .............. *B60W 20/00* (2013.01); *B60W 30/192* (2013.01); *B60W 50/0097* (2013.01); *B60W 2520/10* (2013.01); *B60W 2540/106* (2013.01); *F01N 9/00* (2013.01); *Y02T 10/54* (2013.01); *Y02T 10/6239* (2013.01); *Y02T 10/6291* (2013.01); *Y02T 10/84* (2013.01); *Y02T 10/26* (2013.01); *F01N 13/009* (2014.06)

(56) References Cited

U.S. PATENT DOCUMENTS

| | | | |
|---|---|---|---|
| 6,892,541 B2 * | 5/2005 | Suzuki | 60/706 |
| 2008/0282673 A1 | 11/2008 | Gonze et al. | |
| 2008/0282686 A1 | 11/2008 | Gonze et al. | |

FOREIGN PATENT DOCUMENTS

| | | |
|---|---|---|
| JP | 2008-280983 A | 11/2008 |
| JP | 2009-167875 A | 7/2009 |
| JP | 2009-185777 A | 8/2009 |
| JP | 2009-190564 A | 8/2009 |
| JP | 2009-227039 A | 10/2009 |
| JP | 2009-281254 A | 12/2009 |
| JP | 2009281254 A * | 12/2009 |

OTHER PUBLICATIONS

Japanese Office Action for corresponding JP Patent Application No. 2010-101964 issued on Feb. 24, 2012.

* cited by examiner

CONTROL APPARATUS FOR VEHICLE

BACKGROUND OF THE INVENTION

1. Field of the Invention

The invention relates to a control of a vehicle equipped with an electrically heated catalyst.

2. Description of the Related Art

A vehicle equipped with an internal combustion engine is generally equipped with a catalyst that purifies exhaust gas from the internal combustion engine, that is, removes undesired substances from exhaust gas. If this catalyst has not attained its activation temperature, the catalyst cannot sufficiently purify exhaust gas. Therefore, an electrically heated catalyst (hereinafter, referred to as "EHC") constructed so that the catalyst can be heated by an electric heater or the like has been proposed.

For example, Japanese Patent Application Publication No. 2009-167875 (JP-A-2009-167875) discloses a technology of avoiding deterioration of emissions of a vehicle equipped with an internal combustion engine whose exhaust gas is purified by an EHC, and an electric motor that is driven by electric power supplied from a battery that is rechargeable by an external electric power supply, that is, a so-called plug-in hybrid vehicle. Specifically, if the amount of stored electricity (or state of charge) of the battery is less than a predetermined value and the vehicle is disconnected from the external electric power supply, the technology determines that the engine is likely to be started, and then electrically heats the EHC so as to avoid deterioration of emissions.

However, despite the heating of the EHC prior to the starting of the engine as described in Japanese Patent Application Publication No. 2009-167875 (JP-A-2009-167875), there is still a risk of the EHC failing to sufficiently purify exhaust gas and therefore allowing deterioration of emissions if the engine is started with high load so that a large amount of exhaust gas passes through the EHC.

SUMMARY OF THE INVENTION

It is an object of the invention to avoid deterioration of emissions at the time of starting an engine with high load in a vehicle that has an electrically heatable first catalyst (EHC) in an exhaust passageway of the engine and a second catalyst disposed at a downstream of the first catalyst.

A control apparatus in accordance with a first aspect of the invention controls a vehicle that includes an engine and a first electric motor linked to the engine. The vehicle also includes a first catalyst that is disposed in an exhaust passageway of the engine and that is electrically heatable, and a second catalyst disposed in the exhaust passageway downstream of the first catalyst. The control apparatus includes: a pre-heating control portion that executes a pre-heating control of electrically heating the first catalyst prior to starting of the engine; and a motoring control portion that, during execution of the pre-heating control, predicts whether or not load on the engine following the starting of the engine is to be higher than a predetermined load, and that executes a motoring control of causing heat from the first catalyst to be transferred to the second catalyst by turning the engine via the first electric motor during the execution of the pre-heating control while the engine is not supplied with a fuel, if the load following the starting of the engine is predicted to be higher than the predetermined load.

In the foregoing aspect, the predetermined load may be a load that corresponds to an exhaust gas purification capability of the first catalyst. The motoring control portion may predict the load following the starting of the engine to be higher than the predetermined load, and may execute the motoring control, if, during the execution of the pre-heating control, a demanded drive force of the vehicle is greater than a predetermined value and an amount of increase of the demanded drive force per unit time is greater than a predetermined amount.

The motoring control portion may predict the load following the starting of the engine to be higher than the predetermined load, and may execute the motoring control, if, during the execution of the pre-heating control, a vehicle speed is higher than a predetermined speed and an amount of increase of an accelerator operation amount per unit time is greater than a predetermined amount.

The motoring control portion may stop executing the motoring control if, during execution of the pre-heating control, a temperature of the second catalyst is higher than a predetermined temperature.

The pre-heating control portion may continue executing the pre-heating control until the temperature of the second catalyst is higher than the predetermined temperature.

The vehicle may further include a second electric motor, and an electricity storage device that stores electric power for driving the second electric motor, and the vehicle may move by motive power output by at least one of the engine and the second electric motor. The control apparatus may further include an engine control portion that starts the engine if an amount of stored electricity of the electricity storage device is less than a first amount of stored electricity. The pre-heating control portion may execute the pre-heating control when the amount of stored electricity of the electricity storage device decreases to a second amount of stored electricity that is greater than the first amount of stored electricity by a predetermined amount.

The vehicle may further include a second electric motor, and a planetary gear device. The planetary gear device includes a sun gear linked to the first electric motor, a ring gear linked to the second electric motor, pinions meshing with the sun gear and the ring gear, and a carrier that is linked to the engine and that supports the pinions so that each pinion is rotatable about an axis of the pinion. The motoring control portion may turn the engine while the engine is not supplied with a fuel, by causing torque from the first electric motor to be transmitted to the engine via the planetary gear device.

According to the invention, if, during execution of the pre-heating control, the engine load following the starting of the engine is predicted to be higher than the predetermined load, the engine is forced to turn by using the first electric motor so that a portion of heat from the first catalyst heated by the pre-heating control is transmitted to the downstream-side second catalyst and therefore the exhaust gas purification capability of the second catalyst is enhanced beforehand. Therefore, even if a large amount of exhaust gas is produced when the engine is started with high load, the exhaust gas that is not fully purified by the first catalyst can be appropriately purified by the second catalyst. In consequence, deterioration of emissions at the time of starting the engine can be avoided.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Embodiments of the invention will be described in detail hereinafter with reference to the drawings. Incidentally, the same or comparable portions are denoted by the same reference characters in the drawings, and will not be redundantly described below.

Figure 1:
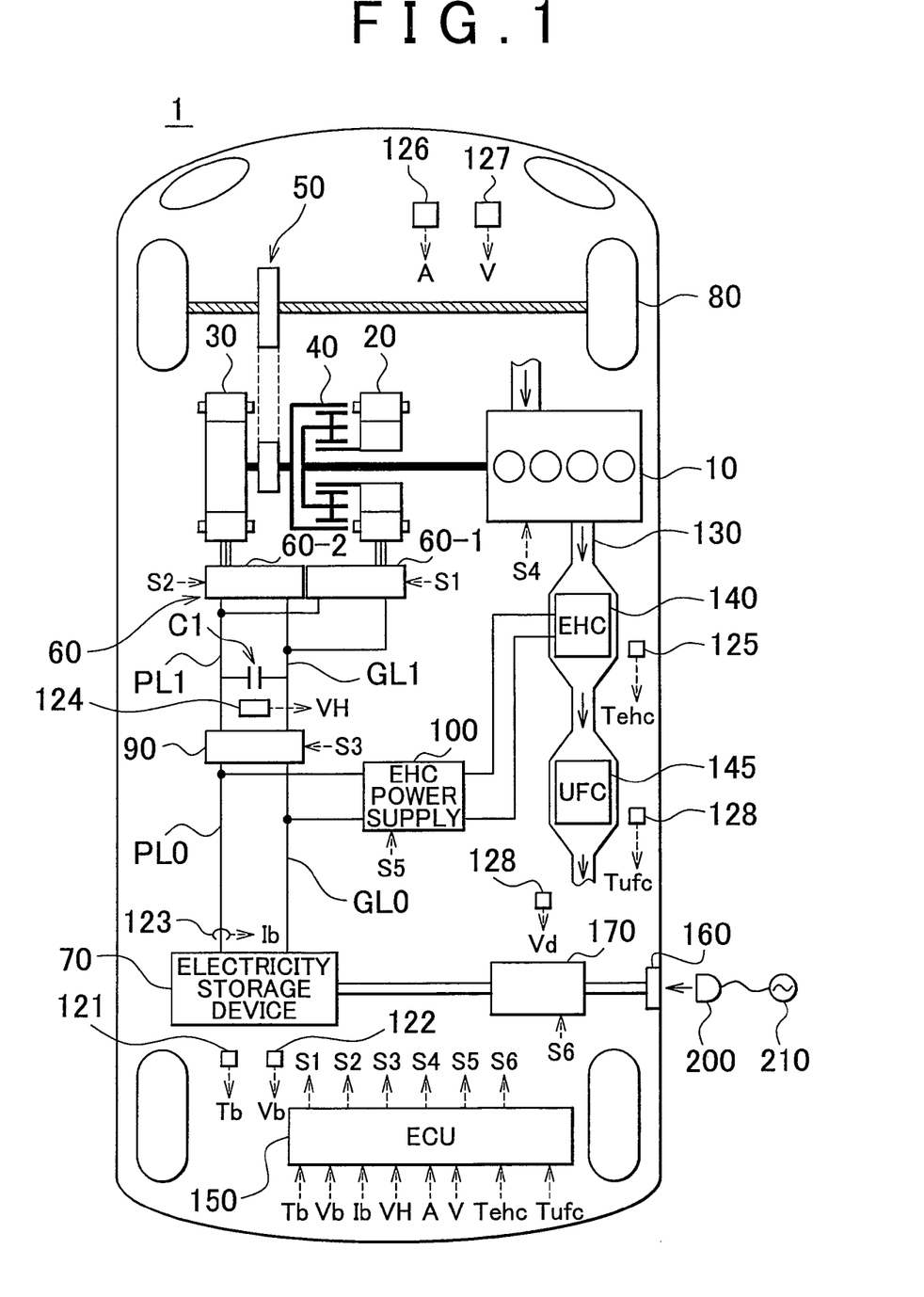
FIG. 1 is an overall block diagram of a vehicle.

FIG. 1 is an overall block diagram of a vehicle 1 that is equipped with a control apparatus in accordance with an embodiment of the invention. Referring to FIG. 1, this vehicle 1 includes an engine 10, a first motor-generator (MG) 20, a second MG 30, a power split device 40, a speed reducer 50, and driving wheels 80. The vehicle 1 is a hybrid vehicle that moves by drive force that is output by at least one of the engine 10 and the second MG 30.

The engine 10 is an internal combustion engine that generates drive force that turns a crankshaft, from combustion energy that is produced when a mixture of fuel and air taken into a combustion chamber is burned.

The first MG 20 and the second MG 30 are alternating-current electric motors, for example, three-phase synchronous electric motors.

The drive force generated by the engine 10 is divided into two paths by the power split device 40. Specifically, one of the paths is a path of transmission to the driving wheels 80 via the speed reducer 50, and the other path is a path of transmission to the first MG 20.

The power split device 40 is made up of a planetary gearset that includes a sun gear, pinions, a carrier and a ring gear. The pinions are in mesh with the sun gear and the ring gear. The carrier supports the pinions so that each pinion is rotatable about an axis thereof, and is linked to the crankshaft of the engine 10. The sun gear is linked to a rotating shaft of the first MG 20. The ring gear is linked to a rotating shaft of the second MG 30 and to the speed reducer 50.

Figure 2:
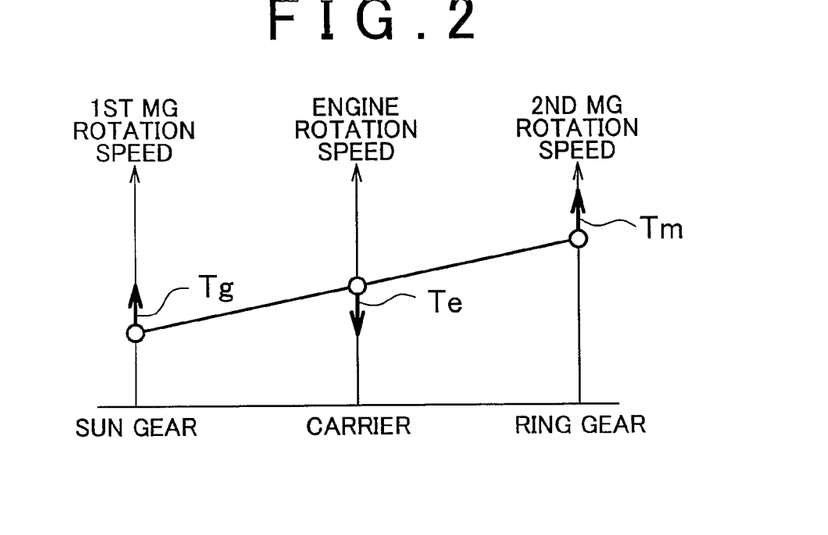
FIG. 2 is an alignment chart showing a relation among the rotation speeds of an engine, a first MG and a second MG.

FIG. 2 is an alignment chart showing a relation among the rotation speeds of the engine 10, the first MG 20 and the second MG 30. Since the engine 10, the first MG 20 and the second MG 30 are interlinked via the power split device 40 made up of the planetary gearset, the rotation speeds of the engine 10, the first MG 20 and the second MG 30 have a relation that is represented by a straight line in the alignment chart shown in FIG. 2. Incidentally, in FIG. 2, "Tg" shows the torque of the first MG 20, and "Tm" shows the torque of the second MG 30, and "Te" shows the torque of the engine 10.

Referring back to FIG. 1, the vehicle 1 further includes a motor-driving device 60, a smoothing capacitor C1, a voltage converter device 90, an electricity storage device 70, an electronic control unit (hereinafter, referred to as "ECU") 150.

The motor-driving device 60 includes a first inverter 60-1 and a second inverter 60-2. The first inverter 60-1 and the second inverter 60-2 are connected to the voltage converter device 90 in parallel with each other.

The first inverter 60-1 is provided between the voltage converter device 90 and the first MG 20. The first inverter 60-1 controls the driving of the first MG 20 on the basis of a control signal S1 from the ECU 150. The second inverter 60-2 is provided between the voltage converter device 90 and the second MG 30. The second inverter 60-2 controls the driving of the second MG 30 on the basis of a control signal S2 from the ECU 150.

The electricity storage device 70 is typically made up of a direct-current secondary battery such as a nickel metal hydride battery, a lithium-ion battery, etc. The voltage Vb of the electricity storage device 70 is, for example, about 280 volts.

The first MG 20 generates electricity by using the motive power from the engine 10 that is divided by the power split device 40. The electric power generated by the first MG 20 is converted from alternating current to direct current by the motor-driving device 60, and the converted electric power is stored into the electricity storage device 70.

The second MG 30 generates drive force by using at least one of the electric power stored in the electricity storage device 70 and the electric power generated by the first MG 20. Then, the drive force of the second MG 30 is transmitted to the driving wheels 80 via the speed reducer 50. Incidentally, although FIG. 1 shows the driving wheels 80 as front wheels, the second MG 30 may also drive rear wheels instead of or as well as the front wheels.

Incidentally, at the time of braking of the vehicle or the like, the second MG 30 is driven by the driving wheels 80 via the speed reducer 50, so that the second MG 30 operates as an electricity generator. Therefore, the second MG 30 functions also as a regenerative brake that converts kinetic energy of the vehicle into electric power. Then, the electric power generated by the second MG 30 is stored into the electricity storage device 70.

The voltage converter device 90 performs voltage conversion between the electricity storage device 70 and the motor-driving device 60. The voltage converter device 90 boosts the voltage Vb of the electricity storage device 70 (more precisely, the voltage VL between a grounded wiring GL0 and a power supply wiring PL0 that interconnect the voltage converter device 90 and the electricity storage device 70) so that the voltage becomes equal to a voltage command value represented by a control signal S3 from the ECU 150, and outputs the boosted voltage to the motor-driving device 60. Due to this, the voltage VH between a grounded wiring GL1 and a power supply wiring PL1 interconnecting the voltage converter device 90 and the motor-driving device 60 is controlled to the voltage command value.

The smoothing capacitor C1 is connected between the power supply wiring PL1 and the grounded wiring GL1. The smoothing capacitor C1 smoothes the voltage VH by storing electric charge that is commensurate with the voltage VH.

The exhaust gas discharged from the engine 10 is discharged into the atmosphere through an exhaust passageway 130. An intermediate portion of the exhaust passageway 130 is provided with a first catalyst 140.

The first catalyst 140 is constructed so that the catalyst for purifying exhaust gas is electrically heatable. Hereinafter, the first catalyst 140 will be also referred to as "EHC (electrically heated catalyst) 140". The EHC 140 is connected to an EHC power supply 100, and heats the catalyst by electric power supplied from the EHC power supply 100. Incidentally, various known EHCs can be employed as the EHC 140.

The EHC power supply 100 is provided between the EHC 140 and the electricity storage device 70. The EHC power supply 100 is connected to the electricity storage device 70, in parallel with the voltage converter device 90. The EHC power supply 100 adjusts the driving electric power for the EHC 140 on the basis of a control signal S5 from the ECU 150.

A second catalyst 145 for purifying exhaust gas is provided at a position in the exhaust passageway 130 at a downstream side of the EHC 140. The second catalyst 145 is provided, for example, under a floor of the vehicle 1. Hereinafter, the second catalyst 145 will be also referred to as "UFC (under-floor catalyst) 145". Incidentally, it suffices that the position at which the second catalyst 145 is provided is downstream of the EHC 140, and the position is not limited to a position under the floor of the vehicle 1.

The vehicle 1 is also equipped with a charging port 160 and a battery charger 170 for charging the electricity storage device 70 with electric power from an external electric power supply 210.

The charging port 160 is an electric power interface for receiving electric power from the external electric power supply 210. When the electricity storage device 70 is charged from the external electric power supply 210, a connector 200 of a charging cable for supplying electric power from the external electric power supply 210 to the vehicle 1 is connected to the charging port 160.

The battery charger 170 is provided between the charging port 160 and the electricity storage device 70. During a charging mode, the battery charger 170 performs voltage conversion of the electric power supplied from the external electric power supply 210 to a voltage level of the electricity storage device 70 on the basis of a control signal S6 from the ECU 150, and accordingly charges the electricity storage device 70.

Besides, the vehicle 1 is further equipped with temperature sensors 121, 125 and 128, voltage sensors 122 and 124, an electric current sensor 123, an accelerator pedal position sensor 126, and a vehicle speed sensor 127.

The temperature sensor 121 detects the temperature Tb of the electricity storage device 70. The temperature sensor 125 detects the temperature Tehc of the EHC 140. The temperature sensor 128 detects the temperature Tufc of the UFC 145. The voltage sensor 122 detects the voltage Vb of the electricity storage device 70. The voltage sensor 124 detects the voltage VH. The electric current sensor 123 detects the current Ib that flows through the power supply wiring PL0. The accelerator pedal position sensor 126 detects the amount of accelerator operation A that is performed by a user. The vehicle speed sensor 127 detects the vehicle speed V. These sensors send results of detection to the ECU 150.

The ECU 150 has a CPU (central processing unit) and a memory that are provided therein, and executes predetermined computation processes on the basis of maps and programs stored in the memory. Incidentally, at least a portion of the ECU 150 may be constructed so as to execute predetermined numerical and logical computation processes by hardware devices such as electronic circuits or the like.

The ECU 150 generates the foregoing control signals S1 to S3 and S5 and S6 on the basis of information from sensors and the like, and outputs the generated control signals to various appliances.

Figure 3:
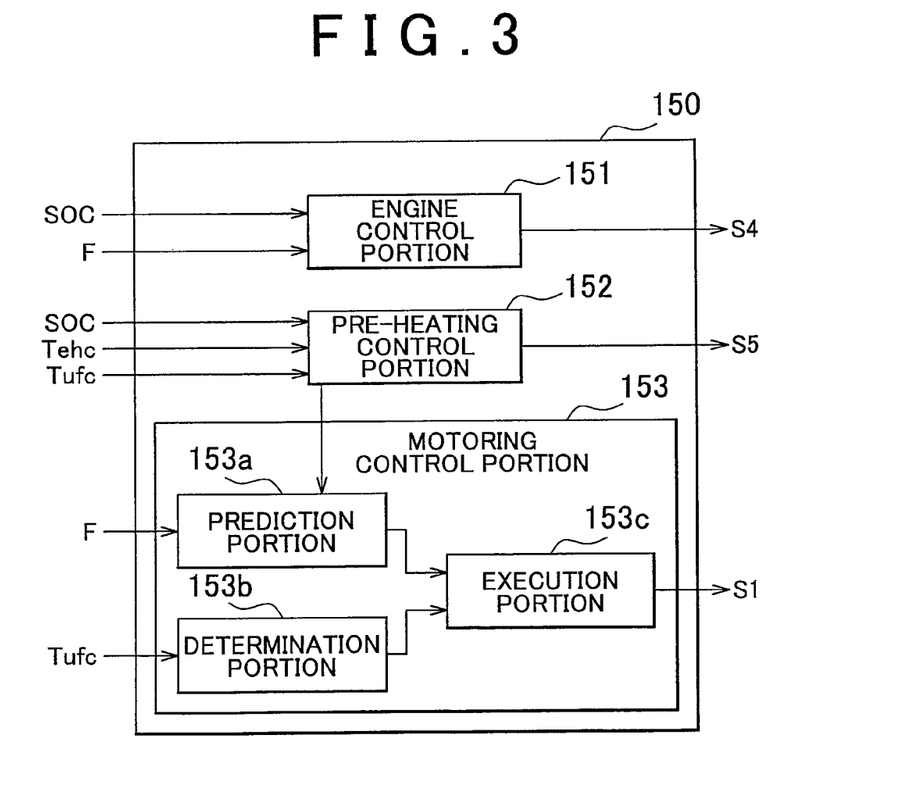
FIG. 3 is a functional block diagram of an ECU.

FIG. 3 is a functional block diagram of a portion of the ECU 150 that concerns the starting of the engine 10. Incidentally, each functional block shown in FIG. 3 may be realized by providing the ECU 150 with a hardware device (an electronic circuit or the like) that performs the function of the functional block, or may also be realized by causing the ECU 150 to perform a software process (execution of a program or the like) that corresponds to the function of the block.

The ECU 150 includes an engine control portion 151, a pre-heating control portion 152, and a motoring control portion 153.

The engine control portion 151 generates a drive signal S4 on the basis of the state of charge SOC (amount of stored electricity) of the electricity storage device 70 that is input from outside, and a demanded drive force F (unit: watt) that is demanded of the vehicle 1, and then outputs the drive signal S4 to the engine 10. It is to be noted herein that the state of charge SOC is calculated by a functional block of the ECU 150 other than those shown in FIG. 3, on the basis of the voltage Vb and the current Ib. Besides, the demanded drive force F is calculated also by a functional block of the ECU 150 other than those shown in FIG. 3, on the basis of the accelerator operation amount A and the vehicle speed V.

If the state of charge SOC is greater than a predetermined value SOC0, the engine control portion 151 determines that it is possible to run the vehicle 1 by using only the electric power from the electricity storage device 70 (the motive power from the second MG), and stops the engine 10. On the other hand, if the state of charge SOC is lower than the predetermined value SOC0, the engine control portion 151 determines that motive power from the engine 10 is needed, and starts the engine 10. Therefore, in the vehicle 1, there are cases wherein the engine 10 is started with high load, depending on the load occurring when the state of charge SOC has decreased to the predetermined value SOC0.

The engine control portion 151 also starts the engine 10 when the demanded drive force F (unit: watt) exceeds a maximum possible output power P0 (unit: watt) of the electricity storage device 70 as well as when the state of charge SOC becomes lower than the predetermined value SOC0. Therefore, the engine 10 is started with high load also when the demanded drive force F exceeds the maximum possible output power P0 of the electricity storage device 70.

Figure 4:
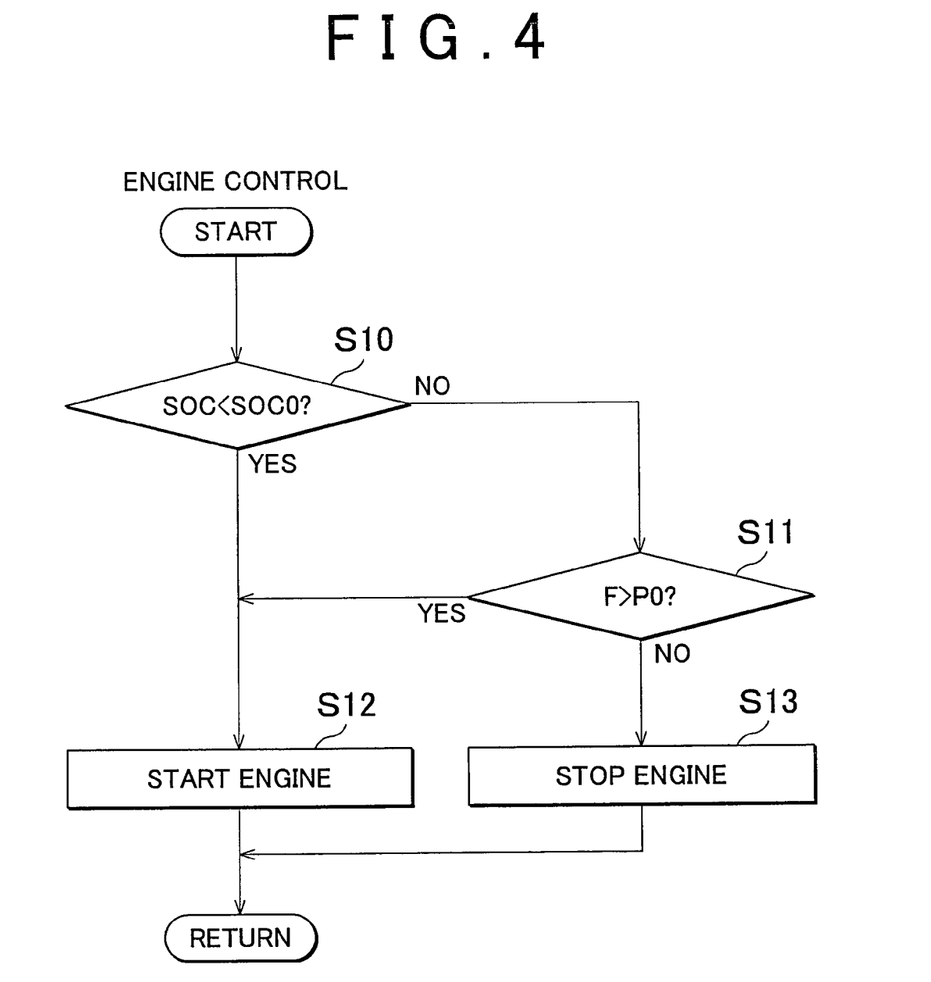
FIG. 4 is a flowchart (Chart 1) showing a processing procedure of the ECU.

FIG. 4 is a flowchart showing a processing procedure of the ECU 150 which realizes the function of the engine control portion 151. Each step (hereinafter, abbreviated as "S") in the flowchart described below is basically realized by a software process performed by the ECU 150. However, each step may also be realized by a hardware process performed by an electronic control unit or the like provided in the ECU 150.

In S10, the ECU 150 determines whether or not the state of charge SOC of the electricity storage device 70 is less than the predetermined value SOC0. If SOC<SOC0 (YES in S10), the process proceeds to S12. If SOC>SOC0 (NO in S10), the process proceeds to S11.

In S11, the ECU 150 determines whether or not the demanded drive force F is greater than the maximum possible output power P0 of the electricity storage device 70. If F>P0 (YES in S11), the process proceeds to S12. If F<P0 (NO in S11), the process proceeds to S13.

In S12, the ECU 150 starts the engine 10. In S13, the ECU 150 stops the engine 10.

Referring back to FIG. 3, the pre-heating control portion 152 executes a control of heating the EHC 140 beforehand by supplying the EHC 140 with electric power before the engine 10 is started by the engine control portion 151 (hereinafter, referred to as "pre-heating control"). More concretely, the pre-heating control portion 152 generates the control signal S5 for starting the pre-heating control, and outputs the signal S5 to the EHC power supply 100, in the case where the state of charge SOC becomes lower than a predetermined value SOC1 or the demanded drive force F exceeds a predetermined power P1 and where the temperature Tehc of the EHC 140 is lower than an activation temperature T1 of the EHC 140 (i.e., a temperature at which the EHC 140 becomes able to deliver a targeted exhaust gas purification performance).

The predetermined value SOC1 is set at a value that is greater than the predetermined value SOC0 by a predetermined amount. Besides, the predetermined power P1 is set at a value that is less than the maximum possible output power P0 of the electricity storage device 70 by a predetermined amount. Due to this, the pre-heating control is executed before the engine 10 is started.

After starting to execute the pre-heating control, the pre-heating control portion 152 continues executing the pre-heating control until the temperature Tehc of the EHC 140 is higher than a predetermined temperature T2 and the temperature Tufc of the UFC 145 is higher than an activation temperature T3 of the UFC 145. Incidentally, the predetermined temperature T2 is set at a value that is higher than the activation temperature T1 of the EHC 140 by a predetermined temperature.

The pre-heating control portion 152 stops executing the pre-heating control when, during execution of the pre-heating control, the temperature Tehc is higher than the predetermined temperature T2 and the temperature Tufc is higher than the activation temperature T3 of the UFC 145 (i.e., a temperature at which the UFC 145 becomes able to deliver a targeted exhaust gas purification performance).

Figure 5:
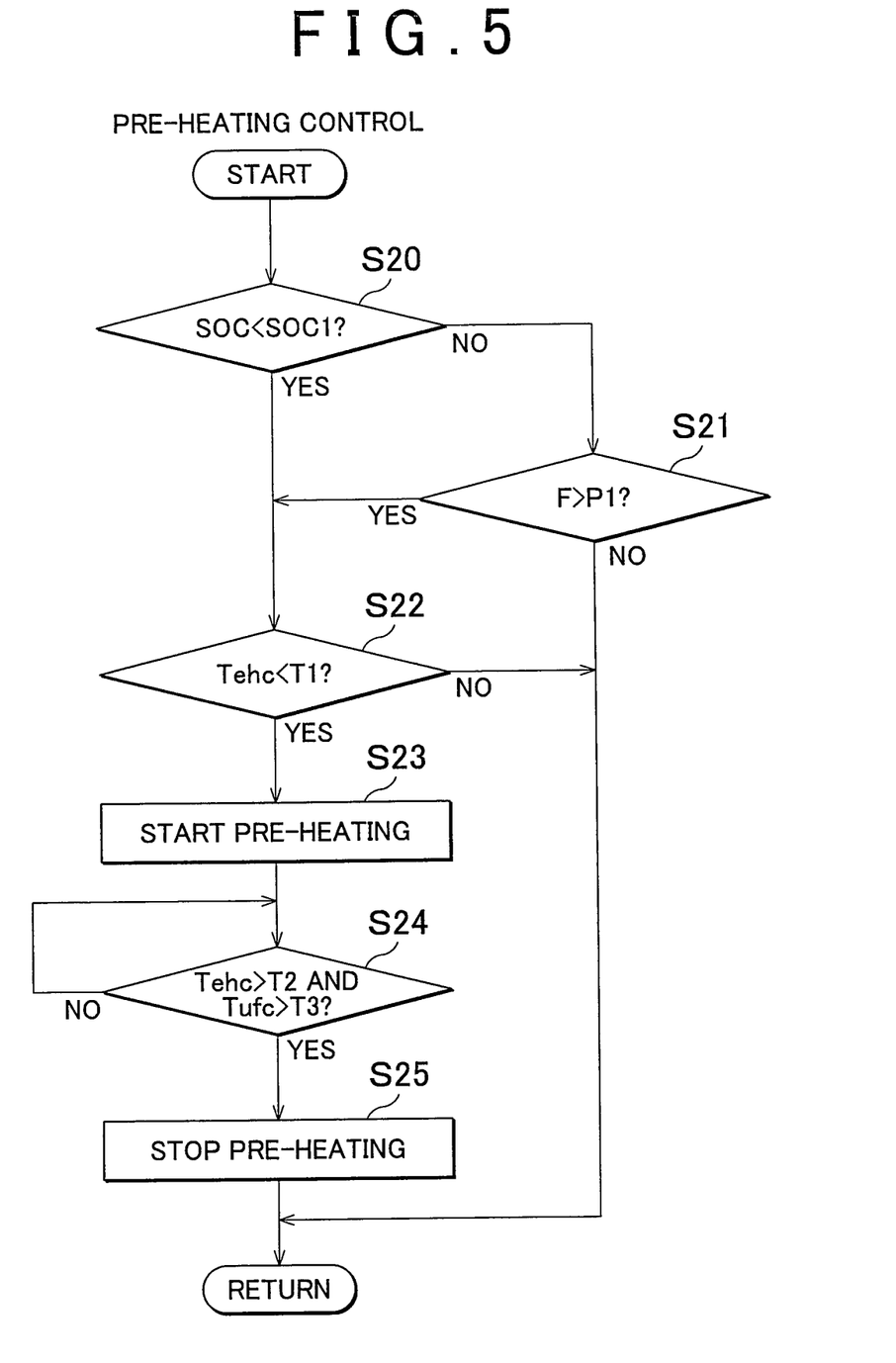
FIG. 5 is a flowchart (Chart 2) showing a processing procedure of the ECU.

FIG. 5 is a flowchart showing a processing procedure of the ECU 150 which realizes the function of the pre-heating control portion 152.

In S20, the ECU 150 determines whether or not the state of charge SOC is less than the predetermined value SOC1. If SOC<SOC1 (YES in S20), the process proceeds to S22. If SOC>SOC1 (NO in S20), the process proceeds to S21.

In S21, the ECU 150 determines whether or not the demanded drive force F has exceeded the predetermined power P1. If F>P1 (YES in S21), the process proceeds to S22. If F<P1 (NO in S21), the process ends.

In S22, the ECU 150 determines whether or not the temperature Tehc is lower than the activation temperature T1 of the EHC 140. If Tehc<T1 (YES in S22), the process proceeds to S23. If Tehc>T1 (NO in S22), the process ends.

In S23, the ECU 150 executes the pre-heating control. In S24, the ECU 150 determines whether or not the temperature Tehc of the EHC 140 is higher than the predetermined temperature T2 and the temperature Tufc is higher than the activation temperature T3 of the UFC 145. If Tehc>T2 and Tufc>T3 (YES in S24), the process proceeds to S25. If not (NO in S24), the process of S24 is repeated.

In S25, the ECU 150 stops executing the pre-heating control. Referring back to FIG. 3, a function of the motoring control portion 153 will be described. The motoring control portion 153 includes a prediction portion 153*a*, a determination portion 153*b* and an execution portion 153*c*.

The prediction portion 153*a*, during execution of the pre-heating control by the pre-heating control portion 152, predicts whether or not the load on the engine 10 following the starting of the engine 10 will be higher than a load that corresponds to an exhaust gas purification capability of the EHC 140. In this embodiment, the prediction portion 153*a* predicts that the load on the engine 10 following the starting of the engine 10 will be higher than the load that corresponds to the exhaust gas purification capability of the EHC 140 (i.e., the EHC 140 will not be able to fully purify exhaust gas of the engine 10), if, during execution of the pre-heating control, the demanded drive force F is greater than a predetermined value F1 and an amount of increase ΔF of the demanded drive force F per unit time is greater than a predetermined amount ΔF1.

If the prediction portion 153*a* predicts that the load on the engine 10 following the starting of the engine 10 will be higher than the load that corresponds to the exhaust gas purification capability of the EHC 140, the execution portion 153*c* executes a control of driving the first MG 20 during the execution of the pre-heating control when the engine 10 is not supplied with fuel and of forcing the engine 10 to rotate with the torque Tg of the first MG 20 that is transmitted to the engine 10 via the power split device 40 (hereinafter, this control performed by the execution portion 153*c* will be referred to as "engine motoring control"). By the engine motoring control, a flow of air can be formed in the exhaust passageway 130, and a portion of the heat from the EHC 140 can be transferred to the UFC 145. Therefore, although the engine 10 has not been started yet, the UFC 145 can be warmed up and activated beforehand.

The determination portion 153*b* determines whether or not the temperature Tufc has become higher than the activation temperature T3 of the UFC 145 due to the foregoing engine motoring control.

The execution portion 153*c* stops executing the engine motoring control when the determination portion 153*b* determines that the temperature Tufc has become higher than the activation temperature T3 of the UFC 145.

Figure 6:
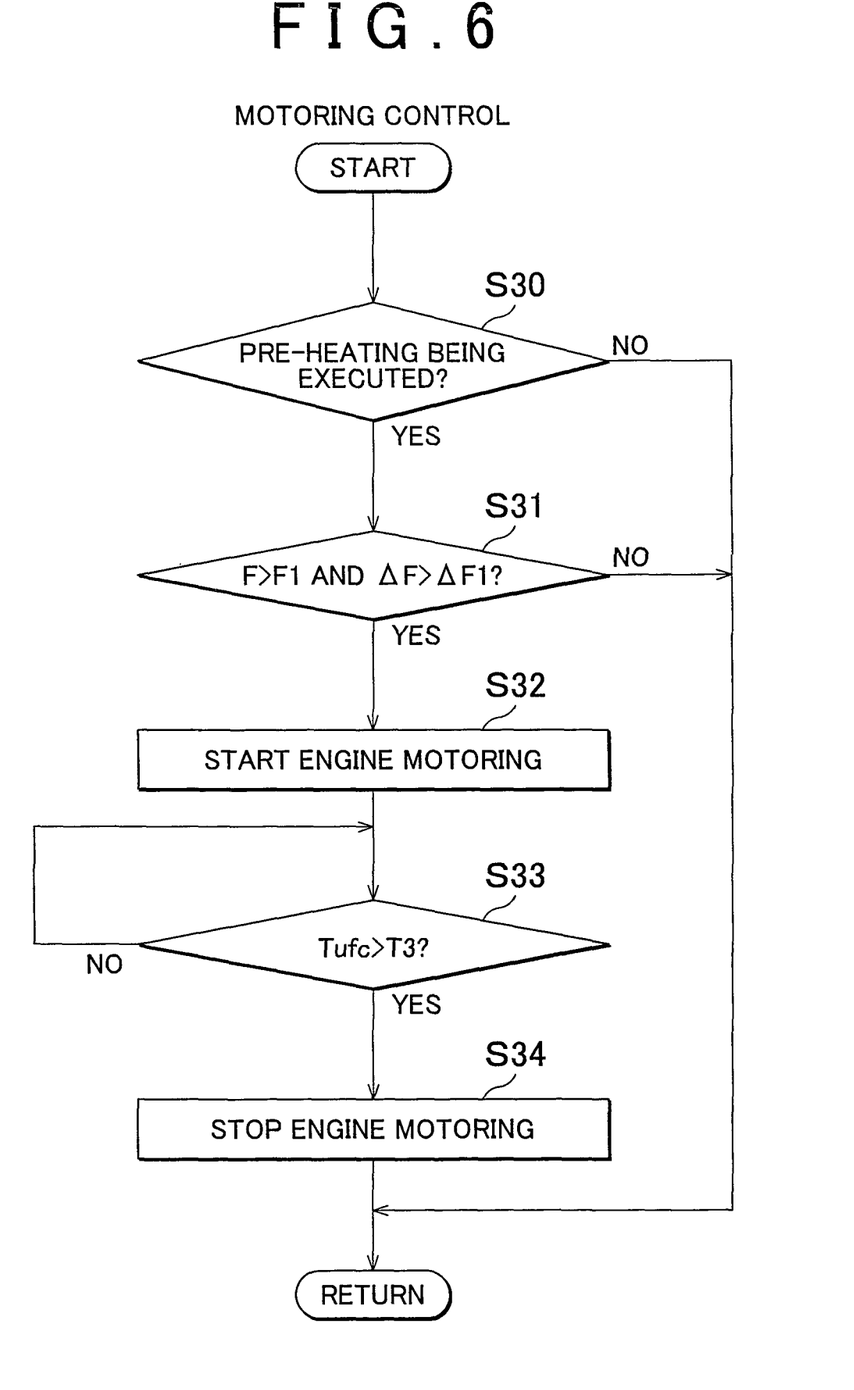
FIG. 6 is a flowchart (Chart 3) showing a processing procedure of the ECU.

FIG. 6 is a flowchart showing a processing procedure of the ECU 150 which realizes the function of the motoring control portion 153.

In S30, the ECU 150 determines whether or not the pre-heating control is being executed. If the pre-heating control is being executed (YES in S30), the process proceeds to S31. If not (NO in S30), the process ends.

In S31, the ECU 150 determines whether or not the demanded drive force F is greater than the predetermined value F1 and the amount of increase ΔF of the demanded drive force F per unit time is greater than the predetermined amount ΔF1. If F>F1 and ΔF>ΔF1 (YES in S31), the ECU 150 predicts that the load on the engine 10 following the starting of the engine 10 will be higher than the load that corresponds to the exhaust gas purification capability of the EHC 140 (i.e., the EHC 140 will not be able to fully purify exhaust gas of the engine 10), and proceeds to S32. If not (NO in S31), the ECU 150 ends the process.

In S32, the ECU 150 starts the engine motoring control. In S33, the ECU 150 determines whether or not the temperature Tufc is higher than the activation temperature T3 of the UFC 145. If Tufc>T3 (YES in S33), the process proceeds to S34. If not (NO in S33), the process of S33 is repeated.

Figure 7:
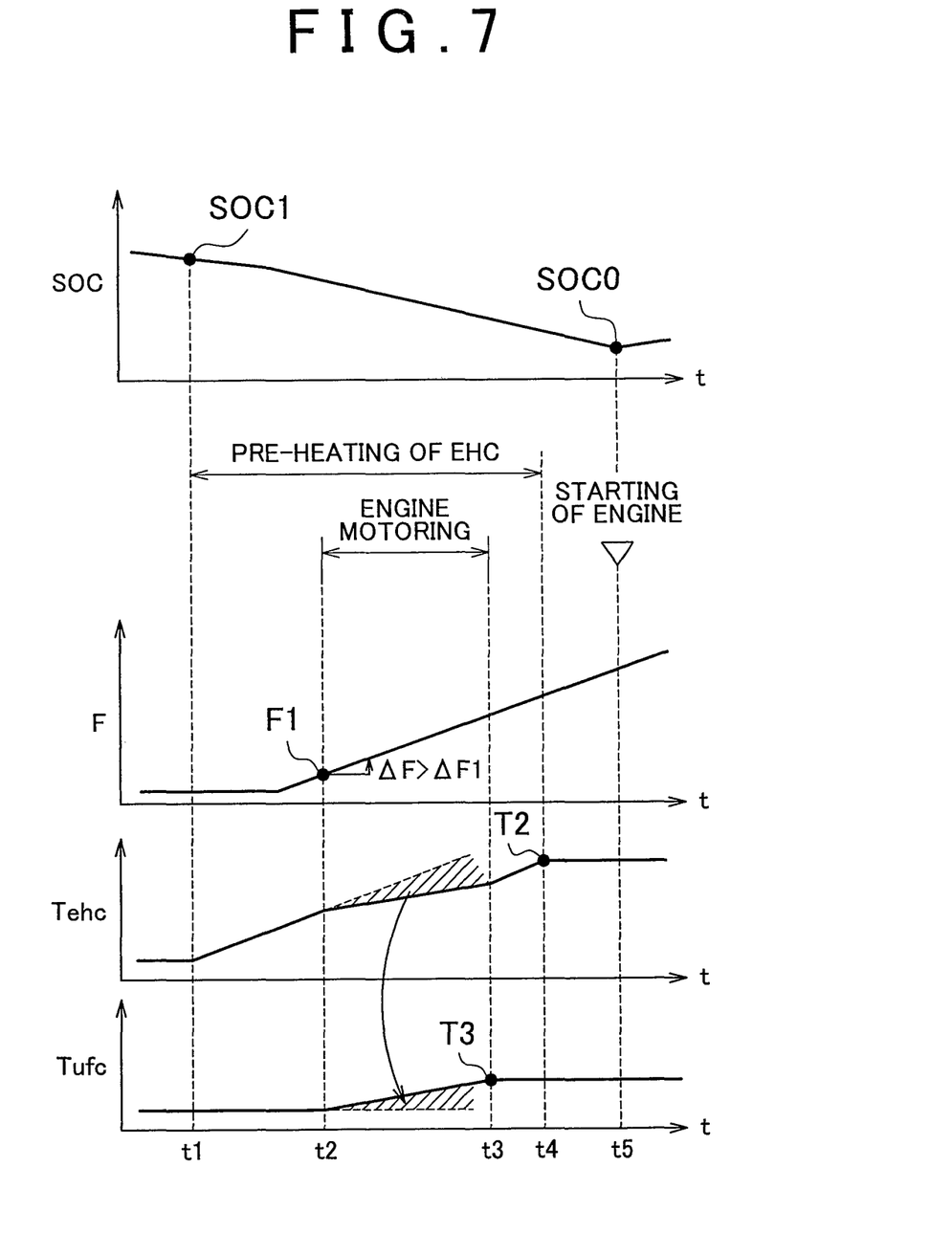
FIG. 7 is a diagram showing an example of time-dependent changes in EHC temperature Tehc and UFC temperature Tufc.

In S34, the ECU 150 stops executing the engine motoring control. FIG. 7 is a diagram showing an example of time-dependent changes in the temperature Mk of the EHC 140 and the temperature Tufc of the UFC 145 in the case where the foregoing functions of the ECU 150 are realized.

If the state of charge SOC becomes lower than the predetermined value SOC1 at time t1 during the traveling of the vehicle 1, the ECU 150 predicts that the engine 10 will be started in the near future, and executes the pre-heating control to heat the EHC 140. Therefore, the temperature Tehc of the EHC 140 begins to rise.

After that, when the demanded drive force F is greater than the predetermined value F1 and the amount of increase ΔF of the demanded drive force F per unit time is greater than the predetermined amount ΔF1 at time t2 due to a user's sharply increasing the accelerator operation amount A, the ECU 150 predicts that the engine load following the starting of the engine 10 will be higher than the load that corresponds to the exhaust gas purification capability of the EHC 140 and therefore the EHC 140 will not be able to fully purify exhaust gas of the engine 10, and therefore starts to execute the engine motoring control.

Due to this engine motoring control, a flow of air is formed in the exhaust passageway 130, and a portion of the heat from the EHC 140 is transferred to the UFC 145. Therefore, although the engine 10 has not been started yet, the UFC 145 can be warmed up and activated beforehand.

After that, when the temperature Tufc of the UFC 145 reaches the activation temperature T3 at time t3, the ECU 150 stops executing the engine motoring control.

Further, when the temperature Tehc of the EHC 140 reaches the predetermined temperature T2 at time t4, the ECU 150 stops executing the pre-heating control.

After that, at time t5 when the state of charge SOC declines to the predetermined value SOC0, the engine 10 is started. At this time point, the EHC 140 has been warmed up beforehand by the pre-heating control, and the UFC 145 has also been warmed up by the engine motoring control. Therefore, if a large amount of exhaust gas should be produced from the engine 10 after time t5, the exhaust gas that is not fully purified by the EHC 140 can be appropriately purified by the UFC 145, which is disposed downstream of the EHC 140. In consequence, the deterioration of emissions at the time of starting the engine 10 with high load can be avoided.

Besides, since the exhaust gas that is not fully purified by the EHC 140 can be purified by the UFC 145, it is possible to reduce the size of the EHC 140. Besides, the size reduction of the EHC 140 makes it possible to restrain the electric power consumption of the EHC 140.

As described above, according to the control apparatus in accordance with the embodiment, if during execution of the pre-heating control, the engine load following the starting of the engine is predicted to be high, the engine is forced to turn by the engine motoring control so that a portion of the heat from the first catalyst electrically heated by the pre-heating control is transferred to the second catalyst disposed at the downstream to enhance the exhaust gas purification capability of the second catalyst beforehand. Therefore, even if a large amount of exhaust gas is subsequently produced at the time of starting the engine, the exhaust gas that is not fully purified by the first catalyst can be appropriately purified by the second catalyst. As a result, it is possible to avoid deterioration of emission when the engine is started with high load.

Figure 8:
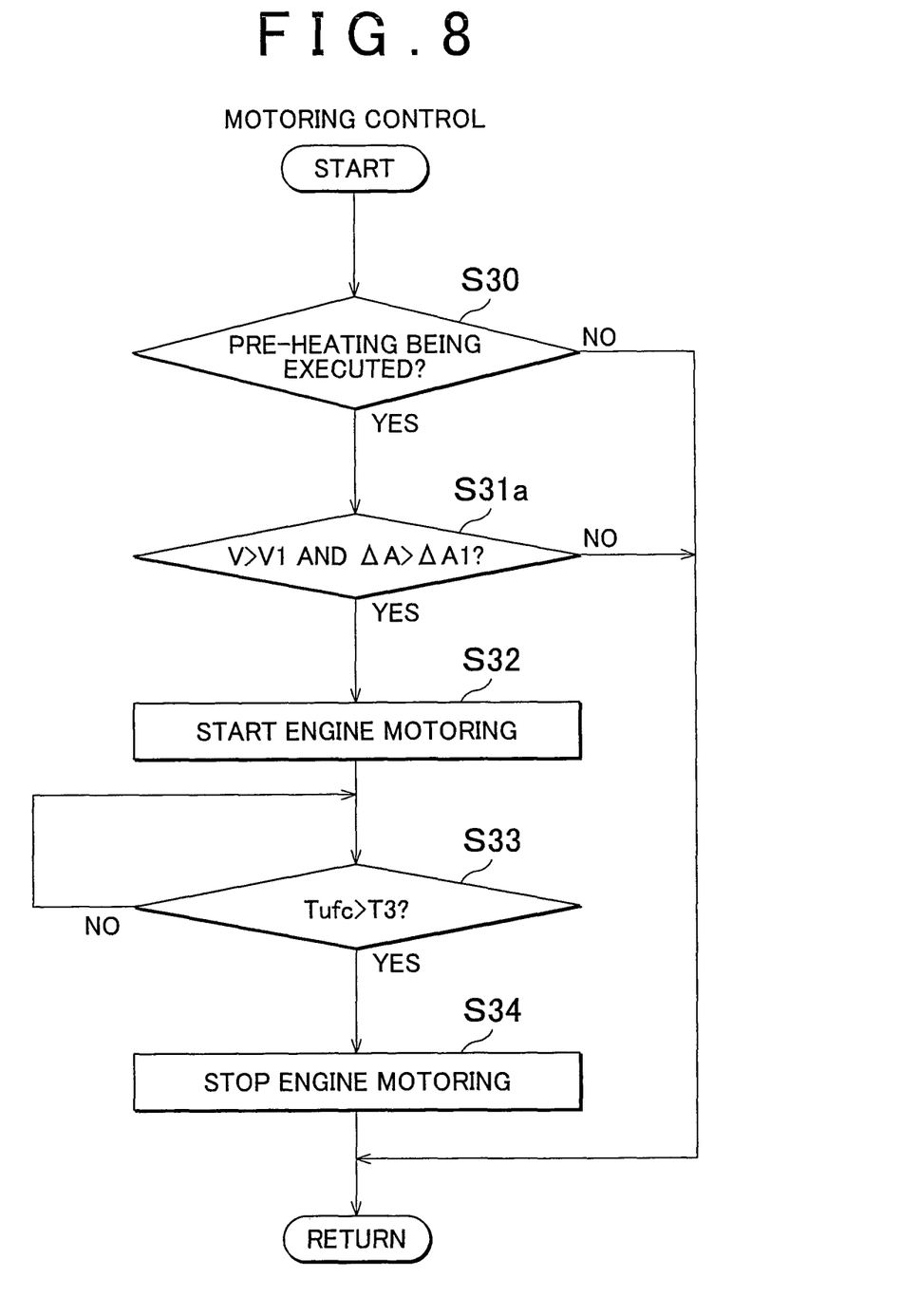
FIG. 8 is a flowchart (Chart 4) showing a processing procedure of the ECU.

Incidentally, the foregoing embodiment may also be modified, for example, as follows. In the foregoing embodiment, if F>F1 and ΔF>ΔF1 in S31 in the flowchart shown in FIG. 6, it is predicted that exhaust gas from the engine 10 cannot be fully purified by the EHC 140. However, the parameters for use for the prediction are not limited to the demanded drive force F and the amount of increase ΔF of the demanded drive force F. For example, instead of the process of S31 in FIG. 6, it is also permissible to perform a process as in S31a shown in FIG. 8 in which it is predicted that the EHC 140 will not be able to fully purify exhaust gas from the engine 10 if the vehicle speed V is greater than a predetermined speed V1 and the amount of increase ΔA of the accelerator operation amount A per unit time is greater than a predetermined amount ΔA1. Then, this prediction is followed by the starting of the engine motoring control.

Besides, although in the embodiment, the invention is applied to a so-called plug-in type hybrid vehicle, this is not restrictive, but the invention may also be applied to ordinary hybrid vehicles. However, it is to be noted that in the plug-in type hybrid vehicle, the engine 10 is less frequently-operated, and the temperatures of the EHC 140 and the UFC 145 are more likely to be low, and high engine load at the time of starting of the engine 10 occurs more frequently than in the ordinary hybrid vehicle. Therefore, the invention is particularly effective for the plug-in type hybrid vehicle.

The embodiments and the like disclosed herein are to be considered illustrative in all respects and not restrictive at all. The scope of the invention is defined not by the foregoing description, but by the appended claims for patent, and is intended to cover all the changes and modifications within the meaning and scope equivalent to the claims for patent.

The invention claimed is:

1. A control apparatus for a vehicle that includes an engine, a first electric motor linked to the engine, a first catalyst that is disposed in an exhaust passageway of the engine and that is electrically heatable, and a second catalyst disposed in the exhaust passageway downstream of the first catalyst, comprising:
   a pre-heating control portion that executes a pre-heating control of electrically heating the first catalyst prior to starting of the engine; and
   a motoring control portion that, during execution of the pre-heating control, predicts whether or not load on the engine following the starting of the engine is to be higher than a predetermined load, and that executes a motoring control of causing heat from the first catalyst to be transferred to the second catalyst by turning the engine via the first electric motor during the execution of the pre-heating control while the engine is not supplied with a fuel, if the load following the starting of the engine is predicted to be higher than the predetermined load, wherein the predetermined load is a load that corresponds to an exhaust gas purification capability of the first catalyst.

2. The control apparatus according to claim 1, wherein the motoring control portion predicts the load following the starting of the engine to be higher than the predetermined load, and executes the motoring control, if, during the execution of the pre-heating control, a demanded drive force of the vehicle is greater than a predetermined value and an amount of increase of the demanded drive force per unit time is greater than a predetermined amount.

3. The control apparatus according to claim 1, wherein the motoring control portion predicts the load following the starting of the engine to be higher than the predetermined load, and executes the motoring control, if, during the execution of the pre-heating control, a vehicle speed is higher than a predetermined speed and an amount of increase of an accelerator operation amount per unit time is greater than a predetermined amount.

4. The control apparatus according to claim 1, wherein the motoring control portion stops executing the motoring control if, during execution of the pre-heating control, a temperature of the second catalyst is higher than a predetermined temperature.

5. The control apparatus according to claim 4, wherein the pre-heating control portion continues executing the pre-heating control until the temperature of the second catalyst is higher than the predetermined temperature.

6. A vehicle comprising:
   an engine;
   a first electric motor linked to the engine;
   a first catalyst that is disposed in an exhaust passageway of the engine and that is electrically heatable;
   a second catalyst disposed in the exhaust passageway downstream of the first catalyst; and a control apparatus that includes
- a pre-heating control portion that executes a pre-heating control of electrically heating the first catalyst prior to starting of the engine, and
- a motoring control portion that, during execution of the pre-heating control, predicts whether or not load on the engine following the starting of the engine is to be higher than a predetermined load, and that executes a motoring control of causing heat from the first catalyst to be transferred to the second catalyst by turning the engine via the first electric motor during the execution of the pre-heating control while the engine is not supplied with a fuel, if the load following the starting of the engine is predicted to be higher than the predetermined load, wherein the predetermined load is a load that corresponds to an exhaust gas purification capability of the first catalyst.

7. The vehicle according to claim 6, further comprising:
a second electric motor; and
an electricity storage device that stores electric power for driving the second electric motor, wherein the vehicle moves by motive power output by at least one of the engine and the second electric motor, and the control apparatus further includes an engine control portion that starts the engine if an amount of stored electricity of the electricity storage device is less than a first amount of stored electricity, and the pre-heating control portion executes the pre-heating control when the amount of stored electricity of the electricity storage device decreases to a second amount of stored electricity that is greater than the first amount of stored electricity by a predetermined amount.

8. The vehicle according to claim 6, further comprising:
a second electric motor; and
a planetary gear device that includes a sun gear linked to the first electric motor, a ring gear linked to the second electric motor, pinions meshing with the sun gear and the ring gear, and a carrier that is linked to the engine and that supports the pinions so that each pinion is rotatable about an axis of the pinion, wherein the motoring control portion turns the engine while the engine is not supplied with a fuel, by causing torque from the first electric motor to be transmitted to the engine via the planetary gear device.

9. A control method for a vehicle that includes an engine, a first electric motor linked to the engine, a first catalyst that is disposed in an exhaust passageway of the engine and that is electrically heatable, and a second catalyst disposed in the exhaust passageway downstream of the first catalyst, comprising:
- executing a pre-heating control of electrically heating the first catalyst prior to starting of the engine;
- predicting, during execution of the pre-heating control, whether or not load on the engine following the starting of the engine is to be higher than a predetermined load; and
- executing a motoring control of causing heat from the first catalyst to be transferred to the second catalyst by turning the engine via the first electric motor during the execution of the pre-heating control while the engine is not supplied with a fuel, if the load following the starting of the engine is predicted to be higher than the predetermined load, wherein the predetermined load is a load that corresponds to an exhaust gas purification capability of the first catalyst.

* * * * *